(12) United States Patent
Lennie et al.

(10) Patent No.: US 6,754,825 B1
(45) Date of Patent: Jun. 22, 2004

(54) SECURE AUTHENTICATION AND AUTHORIZATION FOR TRANSACTION PROCESSING

(75) Inventors: Robert Lennie, Sunnyvale, CA (US); Carl Chen, Mountain View, CA (US); Gabe Dalbec, San Jose, CA (US)

(73) Assignee: Palm Source, Inc., Sunnyvale, CA (US)

( * ) Notice: Subject to any disclaimer, the term of this patent is extended or adjusted under 35 U.S.C. 154(b) by 721 days.

(21) Appl. No.: 09/607,683

(22) Filed: Jun. 30, 2000

(51) Int. Cl.[7] .................................................. H04L 9/00
(52) U.S. Cl. ..................... 713/181; 713/160; 713/161
(58) Field of Search .............................. 713/160, 181, 713/161

(56) References Cited

U.S. PATENT DOCUMENTS

| | | | | |
|---|---|---|---|---|
| 4,386,266 A | * | 5/1983 | Chesarek | 705/72 |
| 5,249,230 A | * | 9/1993 | Mihm, Jr. | 380/249 |
| 6,463,533 B1 | * | 10/2002 | Calamera et al. | 713/163 |

* cited by examiner

Primary Examiner—Gregory Morse
Assistant Examiner—Christopher J. Brown
(74) Attorney, Agent, or Firm—Wagner, Murabito & Hao LLP

(57) ABSTRACT

A method and apparatus for authenticating and authorizing online transactions. An authentication cookie is transmitted to a client system. The authentication cookie includes a user encryption key and an encrypted buffer that contains user identification data and a profile code. Subsequent requests for the particular service use the authentication cookie to generate a query that includes the encrypted buffer and user identification data entered by the user. Portions of the query are encrypted using the user encryption key. Queries received at each authentication and authorization server are authenticated by reconstructing the user encryption key using information transmitted in the clear and decrypting the query using both the reconstructed user encryption key and the secret key. The user identification data entered by the user is then compared with the user identification data in the encrypted buffer for further authentication. The profile code is analyzed for determining authorization. If the query is authenticated and authorized, the authentication and authorization server forwards the request to a server that provides the desired service.

21 Claims, 11 Drawing Sheets

SECURE AUTHENTICATION AND AUTHORIZATION FOR TRANSACTION PROCESSING

BACKGROUND OF THE INVENTION

1. Field of the Invention

The present invention relates to the field of transaction processing. The present invention can relate to the field of palmtop computers and transaction processing using a palmtop computer.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

The latest generation of palmtop computers includes an internal RF transceiver that allows a user to carry out many types of online transactions from almost anywhere. Many online transactions involve access to information or services. For these types of transactions, users are typically required to pay access fees. However, to prevent fraud, and to assure that only paying users are accesing fee-based services, authentication and authorization of users is required. That is, the request must be authenticated to make sure that it originated from a particular user and the access must be authorized. That is, the particular user must be entitled to use that particular service at the time of the requested access to the service.

Authentication and authorization of palmtop computer users is typically accomplished as follows. Upon payment of the required fee, an identification number associated with a particular palmtop computer is entered into one or more database. Each time that a user requests access to information, the palmtop computer is queried to determine the identification number of the palmtop computer from which the request originated. The database containing the requested information then compares the identification number with authorized identification numbers to determine whether the request is coming from an authorized palmtop computer. If the request is coming from an authorized palmtop computer, the requested information is obtained and is sent from the database to the palmtop computer.

These types of prior art systems require multiple transmissions between the database containing the desired information and the requesting palmtop computer. This consumes valuable power and system resources of the palmtop computer, slowing response time. Also, the use of multiple transmissions, database searches, and comparisons of received data to data from the database further slow response time and consume valuable processing resources of each server that provides a service each time that a request for services is received. In addition, constant updating of authorization numbers is required on all systems that provide services. Moreover, because the identification number of the device is used for authentication, users cannot access services using computing devices other than the particular device that was used when the service was initially ordered. This is particularly disadvantageous to those users that have multiple palmtop computers because they must register each palmtop computer for each desired service.

Therefore, it would be useful to provide a way to authenticate and authorize usage of transaction services that will allow for quick access to the desired service and that would not consume excessive power and system resources of a palmtop computer. Also, a way to authenticate and authorize usage of transaction services is needed that will not require constant updating of authorization numbers, and that will not consume valuable processing resources at each system that provides services. In addition, a way to authenticate and authorize usage of transaction services is needed that allows for access from multiple palmtop computers and that allows for access from other computing devices.

SUMMARY OF THE INVENTION

A method and apparatus for secure transaction processing which can be utilized with a palmtop computer is described that allows for quick access to services while providing authentication and authorization. The method and apparatus of the present invention does not consume excessive power and system resources of a palmtop computer. Also, the method and apparatus of the present invention allows for access to services from client systems other than palmtop computers and allows for the use of multiple client systems to access services using a single account.

Upon activation, an entry is created in a user database. The user will have a certain profile that is represented in the user database. The first time that a client attempts to access a service for which a fee is charged, a software program on the client system will detect the absence of an authentication cookie. This will cause the software program to send a registration request to a server. This request will result in the the assignment of user identification data and the generation of an authentication cookie that is returned to the client system. The authentication cookie is then stored on the client system.

In the present embodiment, the authentication cookie includes a user encryption key that is generated using a secret key and other data relating to the user or that is arbitrarily generated. In one embodiment, a key identifier, user identification data and a secret key are used to generate the user encryption key. The cookie also includes an encrypted buffer that includes the user identification data and profile code. The profile code identifies the services that the user is entitled to use.

Subsequent requests prompt the user to enter user identification data. The entered user identification data is used in conjunction with data from the authentication cookie to generate a query. In the present embodiment, the query includes a request buffer and the encrypted buffer from the received cookie which are encrypted using the user encryption key. The user identification data entered by the user and the key identifier are then added to encrypted portion of the query "in the clear" (e.g., not encrypted). The query is then transmitted from the client system to an authentication and authorization server.

Queries received at each authentication and authorization server are analyzed to determine if the query is authentic and authorized. In the present embodiment, the authentication and authorization server reads the user identification data input by the user and the key identifier, which are then used to reconstruct the user encryption key. The authentication and authorization server then uses the reconstructed user encryption key to decrypt the request buffer. If the decryption fails, the server will return an authentication failure response to the client system.

If the decryption is successful, the authentication and authorization server will decrypt the encrypted buffer and will retrieve the user identification data and profile code. If the decryption fails, or if the user identification data input by the user does not match the user identification data from the encrypted buffer, the server will return an "authorization failure" response to the client computer.

If the decryption is successful and if the user identification data input by the user matches the user identification data from the encrypted buffer, the server will analyze the profile code to determine whether the profile code indicates that the user is entitled to the requested service.

If the profile code indicates that the user is entitled to the requested service, the authentication and authorization server will forward the unencrypted request buffer to a server that provides the desired service.

A response to the query is then generated and is transmitted from the server that provides the desired service, via the authentication and authorization server, back to the client system.

Authentication and authorization of a query is accomplished without recourse to the registration server or the user database. Thus, the heavy user traffic problems that would arise in a wireless environment of limited bandwidth if the registration server and the user database were directly accessed for every client request are avoided. Also, because the authentication credentials are located on the client system, the authentication and authorization server can authenticate and authorize users "on the fly" to reduce the adverse effect of wireless network latency on system performance.

The registration process can be performed multiple times by an authorized user using different client systems. Each time that a client registers a particular client system, that client system receives a unique user encryption key. This allows a user to access services easily; connecting over any available network, to access services using the same account, and allows for the use of multiple devices. Furthermore, the network of the present invention provides for use of client devices other than palmtop computers, allowing connection over any available network or client device to access services.

In contrast to prior art systems and methods for authentication and authorization, the method and apparatus of the present invention provides single-transmission authentication and authorization. That is, there is no need to send multiple transmissions between the user device and the authorizing server as is required in prior art systems. This approach also has the benefits of providing near instant access to services while simultaneously providing low cost of service by controlling airtime usage. This in turn results in long battery life when a palmtop computer is used since transmissions from the palmtop computer can be a substantial drain on batteries.

DETAILED DESCRIPTION OF THE INVENTION

Figure 1:
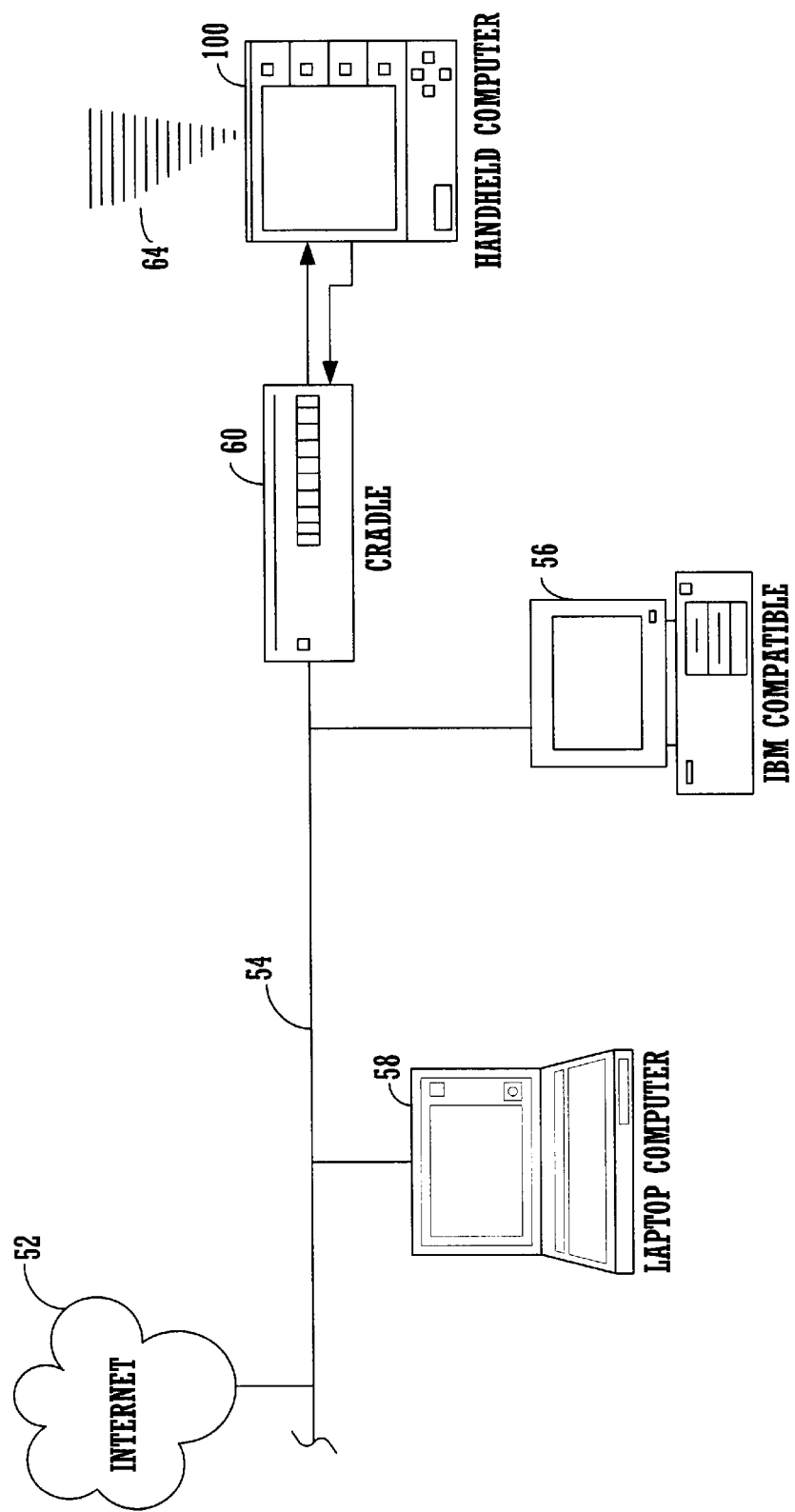
FIG. 1 is system illustration of a palmtop computer system connected to other computer systems and the Internet via a cradle device.

In the following detailed description of the present invention, a secure transaction processing arrangement for use with a palmtop computer, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "encrypting" or "decrypting" or "receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System and Palmtop Computer

While this invention is susceptible of embodiment in many different forms, there is shown in the drawings and will herein be described in detail, specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

FIG. 1 illustrates a system 50 that can be used in conjunction with the secure authentication and authorization system for transaction processing system and method of the present invention. It is appreciated that system 50 is exemplary only and that embodiments of the present invention can operate with other systems. System 50 comprises a host computer system 56 which either can be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Bus 54 is also coupled to a cradle 60 for receiving and initiating communication with a palm top ("palm-sized") portable computer system 100 of the present invention. Cradle 60 provides an electrical and mechanical communication interface between bus 54 (and anything coupled to bus 54) and the computer system 100 for two-way communications. Computer system 100 also contains a wireless infrared communication mechanism 64 for sending and receiving information from other devices.

Figure 2A:
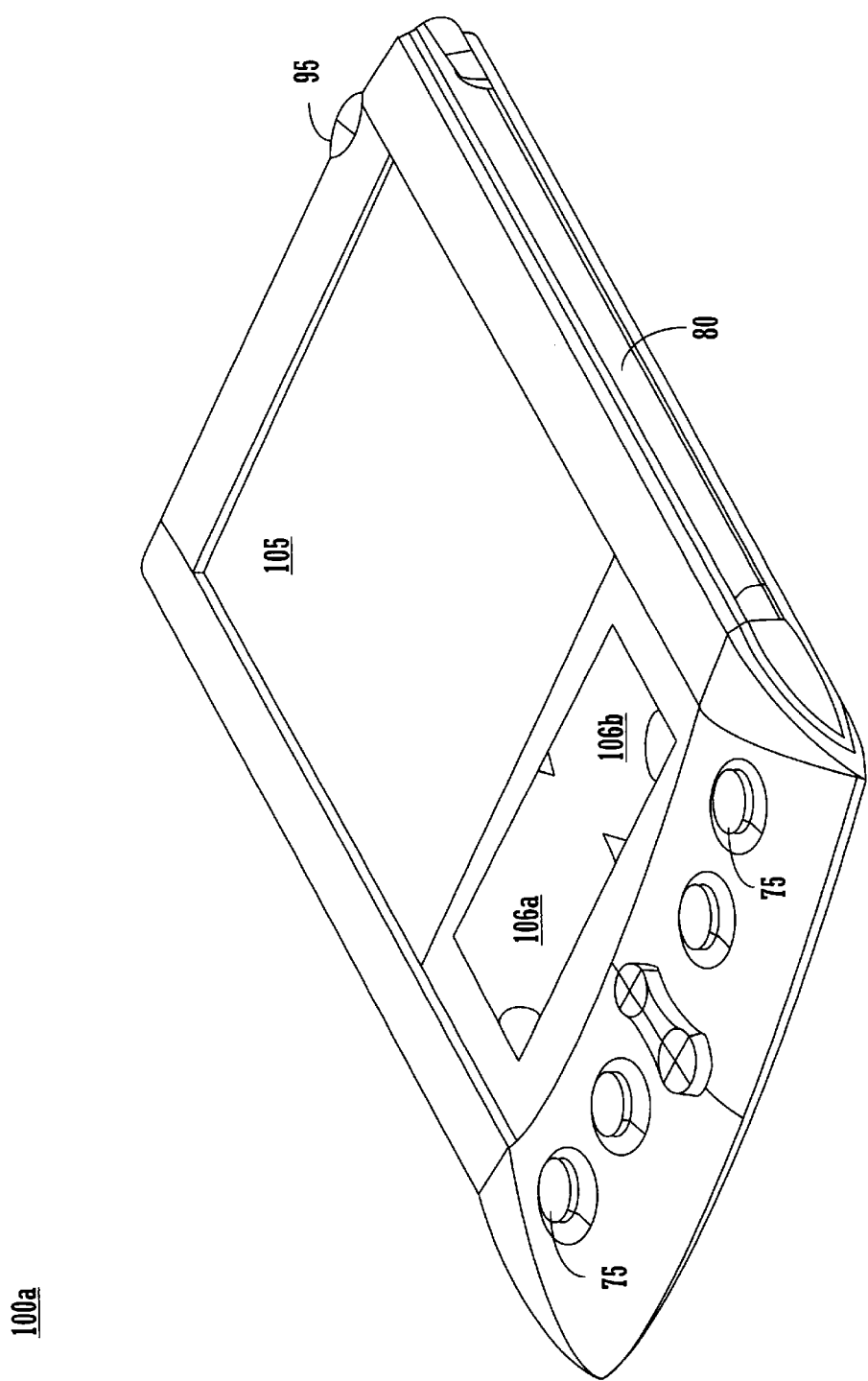
FIG. 2A is a top side perspective view of a palmtop computer system that can be used as a platform for authentication and authorization for transaction processing in accordance with an embodiment of the present invention.

FIG. 2A is a perspective illustration of the top face 100a of one embodiment of the palmtop computer system of the present invention. System 100 is exemplary only. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alpha characters therein for automatic recognition and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 2B:
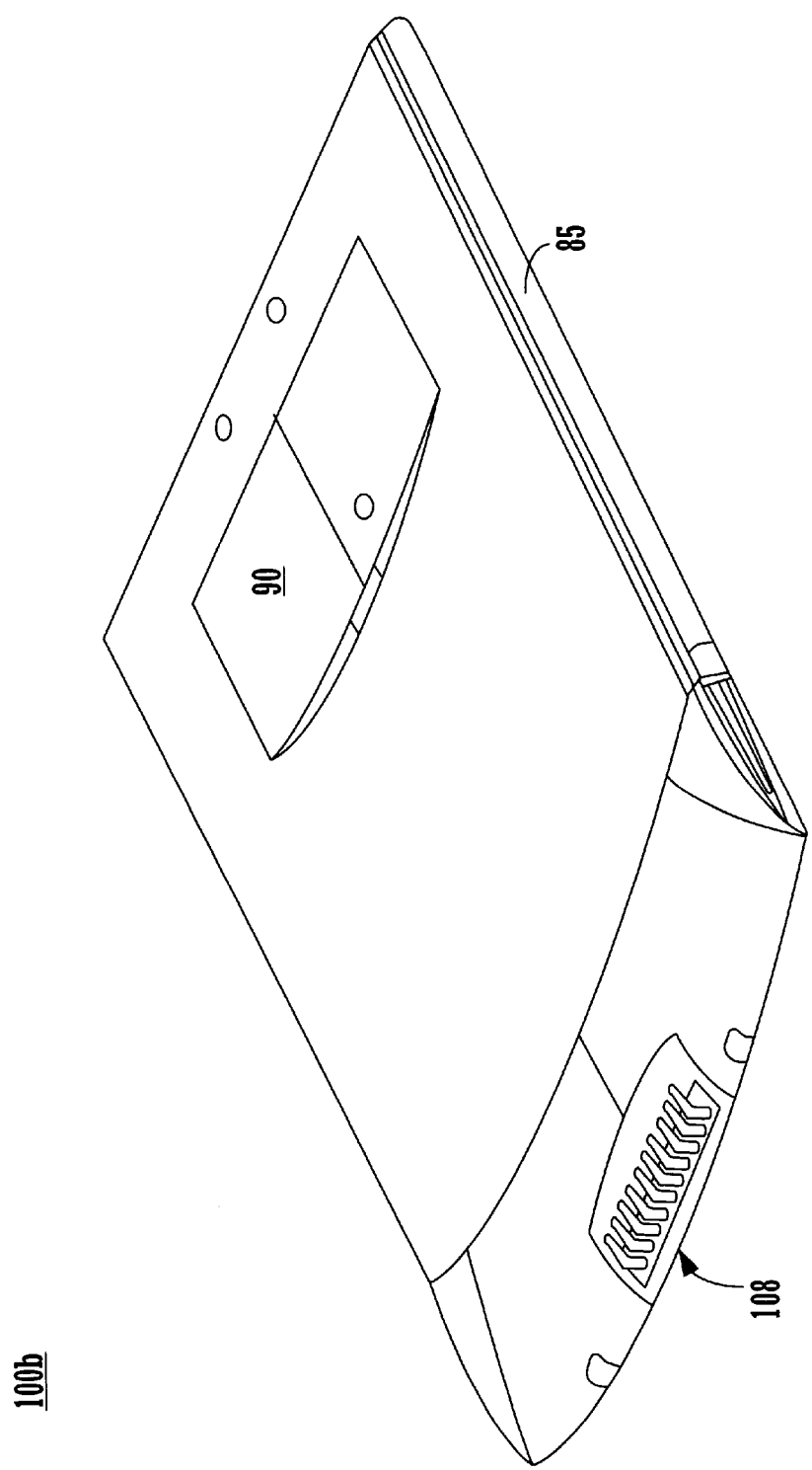
FIG. 2B is a bottom side perspective view of the palmtop computer system of FIG. 2A in accordance with an embodiment of the present invention.

FIG. 2B illustrates the bottom side 100b of one embodiment of the palmtop computer system of the present invention. An optional extendible antenna 85 and a battery storage compartment door 90 are shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc.

Figure 3:
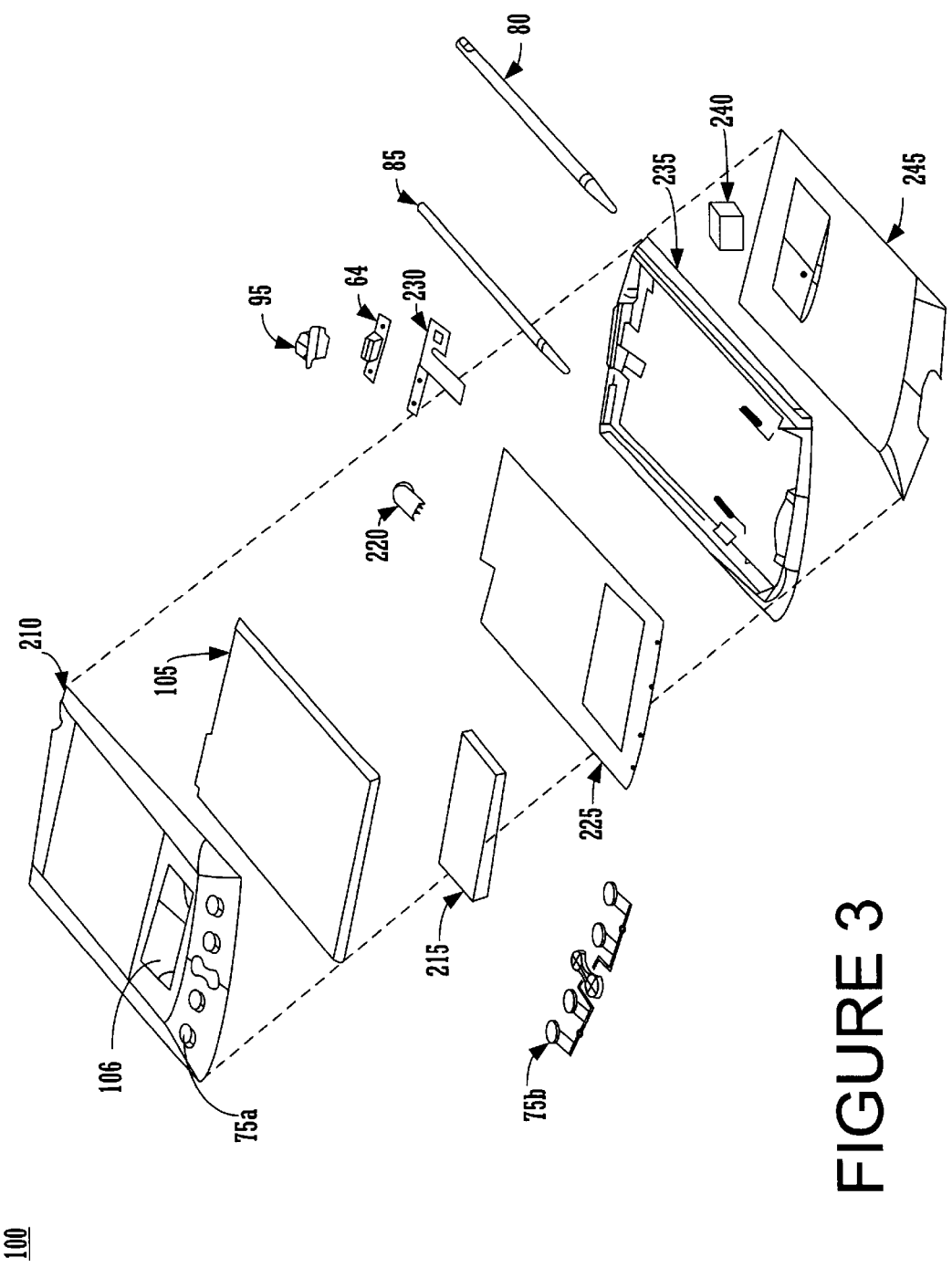
FIG. 3 is an exploded view of the components of the palmtop computer system of FIG. 2A in accordance with an embodiment of the present invention.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and coupled to communicate with the PC board 225. In one implementation, the Mobitex wireless communication system is used to provide two-way communication between system 100 and other networked computers and/or the Internet via an authentication and authorization system server.

Figure 4:
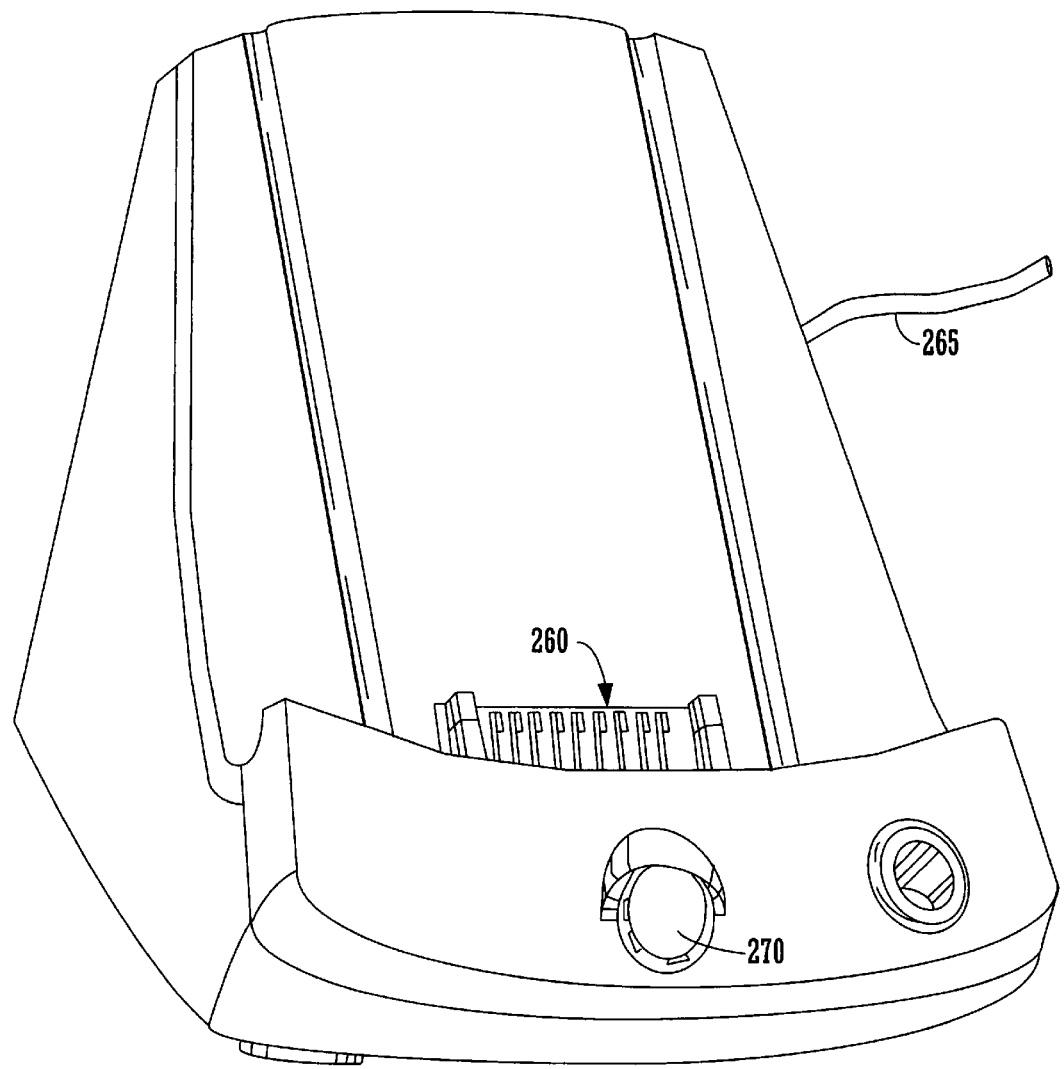
FIG. 4 is a perspective view of the cradle device for connecting the palmtop computer system to other systems via a communication interface in accordance with an embodiment of the present invention.

FIG. 4 is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two-way communication between system 100 and other computer systems coupled to serial communication 265.

Figure 5:
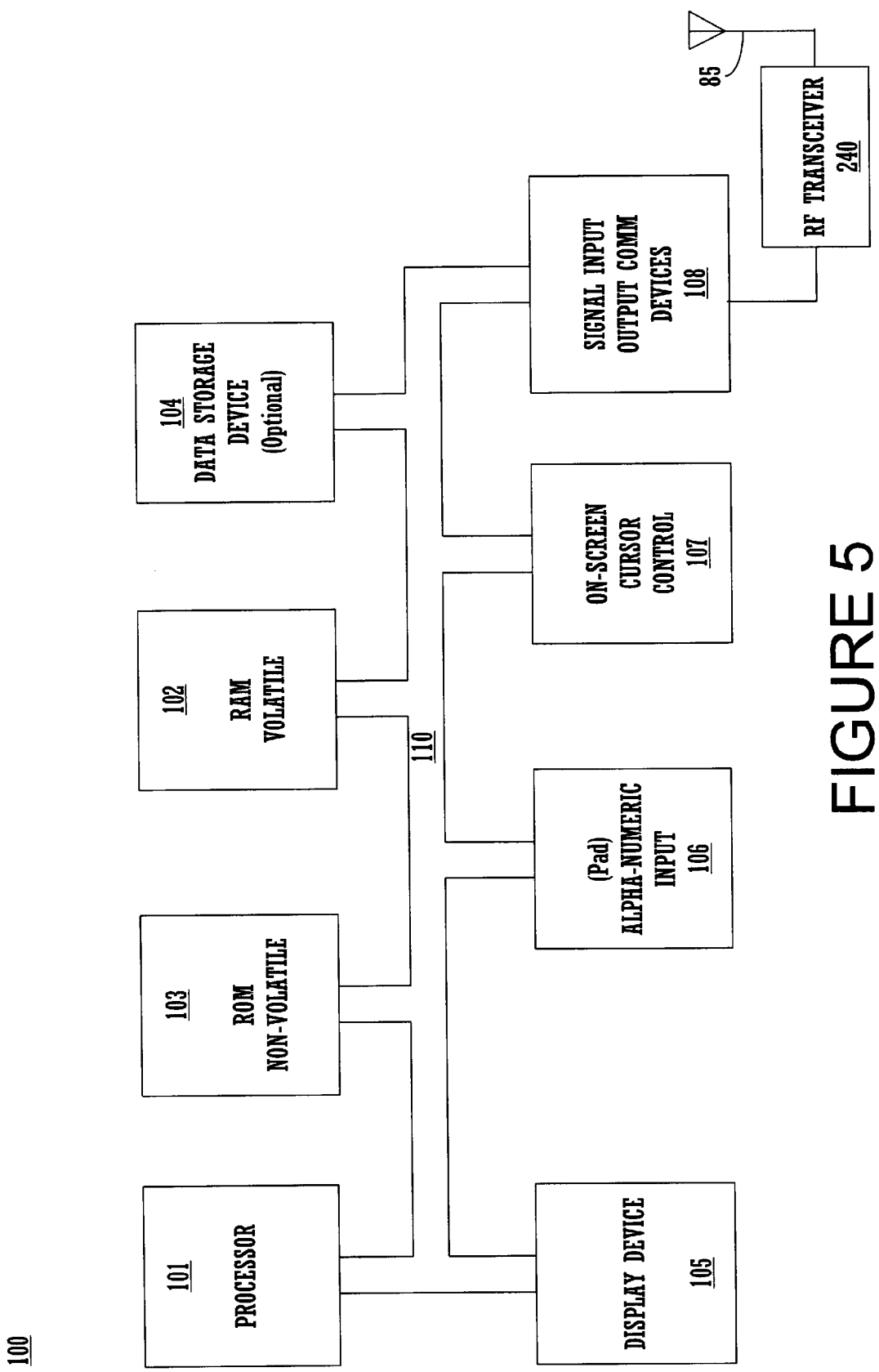
FIG. 5 is a logical block diagram of the palmtop computer system in accordance with an embodiment of the present invention.

FIG. 5 illustrates circuitry of computer system 100, some of which can be implemented on PC board 225. Computer system 100 includes an address/data bus 110 for communicating information, a central processor 101 coupled with the bus 110 for processing information and instructions, a volatile memory 102 (e.g., random access memory RAM) coupled with the bus 110 for storing information and instructions for the central processor 101 and a non-volatile memory 103 (e.g., read only memory ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, system 100 also contains a display device 105 coupled to the bus 110 for displaying information to the computer user. PC board 225 can contain the processor 101, the bus 110, the ROM 103 and the RAM 102.

Also included in computer system 100 of FIG. 5 is an optional alphanumeric input device 106 which in one implementation is a handwriting recognition pad ("digitizer") having regions 106*a* and 106*b* (FIG. 2A), for instance. Device 106 can communicate information and command selections to the central processor 101. System 100 also includes an optional cursor control or directing device 107 coupled to the bus 110 for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 110, can be a serial port for communicating with the cradle 60. Device 108 can also include an infrared communication port. In the present embodiment, computer system 100 includes RF transceiver 240 that communicates via antenna 85.

Figure 6:
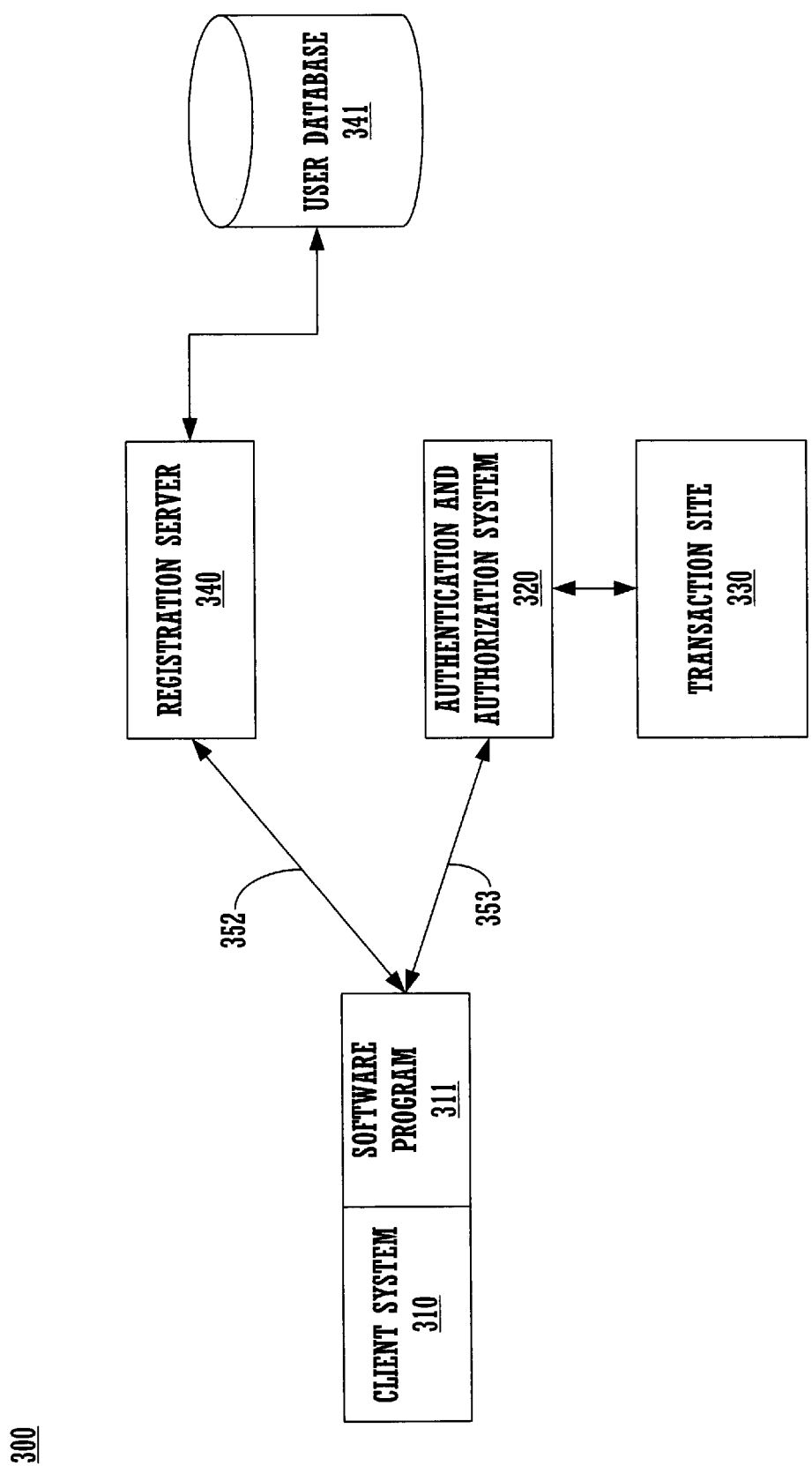
FIG. 6 is a block diagram of the major components of a system for user authentication and authorization for transaction processing in accordance with an embodiment of the present invention.

Method and System for Secure Authentication and Authorization for Transaction Processing Referring now to FIG. 6, a system 300 is shown that includes client system 310. In one embodiment, client system 310 is a palmtop computer such as palmtop computer 100 of FIGS. 1–5. Alternatively, client system is another type of computing system such as, for example, laptop computer 58 or IBM compatible computer 56 of FIG. 1. Client system 310 communicates, as shown by arrow 352, with registration server 340 and communicates, as shown by arrow 353, with authentication and authorization system 320. In one embodiment of the present invention, a wireless data network is used to couple communication between client system 310 and registration server 340 and between client system 310 and authentication and authorization system 320.

Continuing with FIG. 6, registration server 340 is coupled to user database 341. In the present embodiment, user database 341 includes client data. In one embodiment, user database 341 resides on registration server 340. While not explicitly illustrated in FIG. 6, registration server 340 is preferably a secure server in that it is protected by firewall and encryption technologies to assure the security of the information stored in user database 341.

In one embodiment of the present invention, upon activation, a user creates an entry in the user database 341. The user will have a certain profile that is represented in this database. Upon an initial request to access services provided by transaction site 330, client system 310 communicates with registration server 340 to register the client for the desired transaction service. In one embodiment, registration is required for access to each different category of service. That is, for example, for receiving information such as stock market quotes or financial data, the user must register to receive the desired information service. If the user additionally desires the use of a web-clipping service, for example, the user must separately register for use of web-clipping services. The registration process results in a new user profile that indicates which type of services a user can access. Upon completion of the registration process, a cookie is delivered from registration server 340 to client system 310.

After registration is complete, subsequent requests for information or services are transmitted to authentication and authorization system 320. Authentication and authorization system 320 is coupled to transaction site 330, and acts as a gateway for coupling requests for information or services to transaction site 330. More particularly, in the present embodiment, authentication and authorization system 320 analyzes incoming queries from client system 310 to determine authentication and authorization. In one embodiment, authentication and authorization server is a full-size stand-alone computer (e.g. computer 56 of FIG. 1 or computer 100 of FIG. 5).

Transaction site 330 provides one or more service. In the present embodiment, the term "service," includes any and all types of services that can be provided to client system 210, including without limitation, web clipping services, Internet access, financial transactions, stock purchase and sale transactions, consumer goods purchases and sale transactions, commerical goods transactions, database access, information services, etc In one embodiment of the present invention, transaction site 330 provides information services. That is, requests for information received from client system 310, that are authentic and authorized, generate a search of one or more databases (not shown) available through transaction site 330, for obtaining the requested information. The requested information is then transmitted back client system 310.

Figure 7:
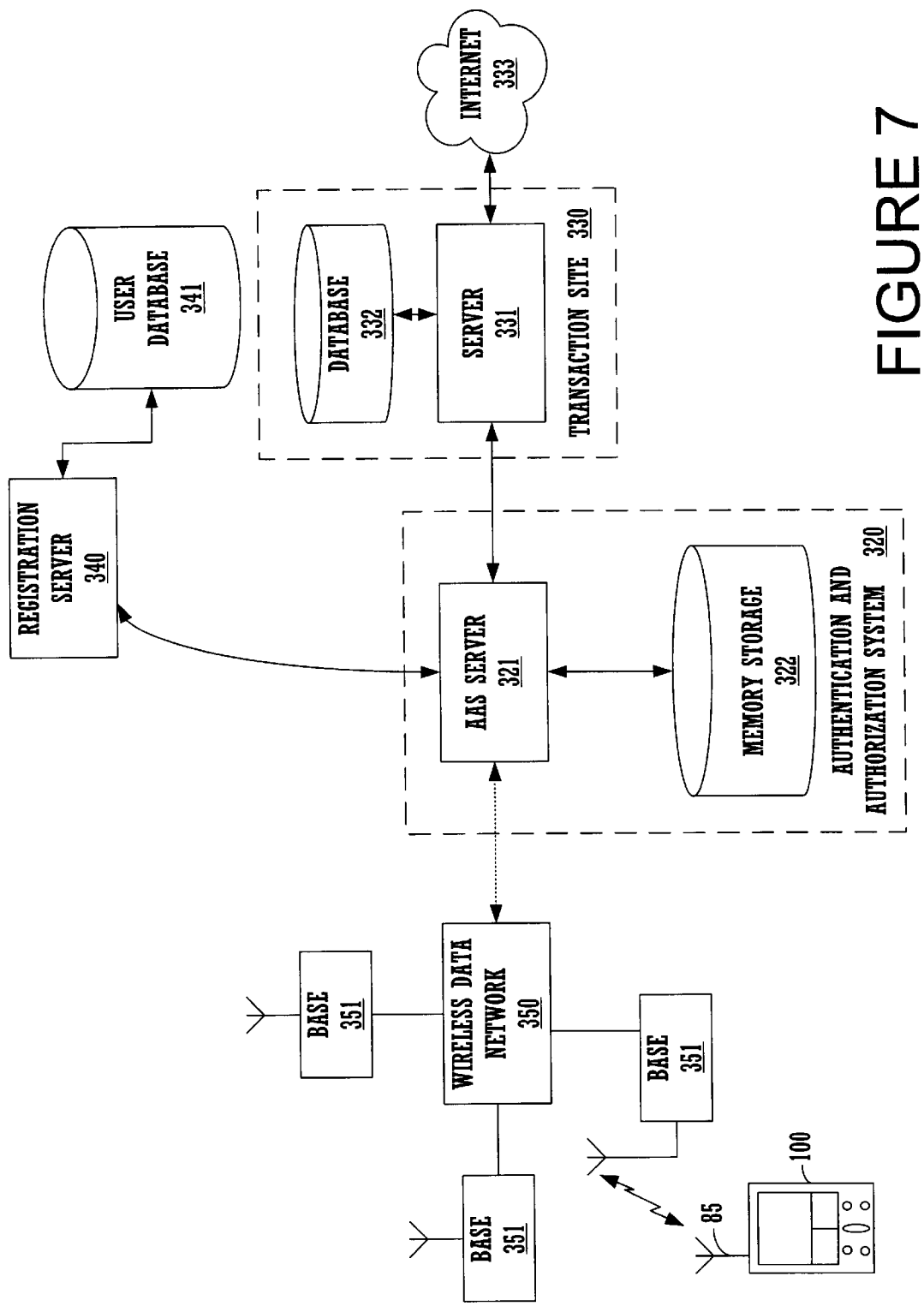
FIG. 7 is a diagram illustrating a system for user authentication and authorization for transaction processing that couples data over a wireless network in accordance with an embodiment of the present invention.

FIG. 7 shows an alternate embodiment of the present invention in which all communications are coupled through authentication and authorization system 320. In one embodiment of the present invention that is illustrated in FIG. 7, client system 310 is a palmtop computer 100. Palmtop computer 100 uses wireless data network 350 for communication with authentication and authorization system 320. More particularly, in the present embodiment, palmtop computer 100 communicates via antenna 85 with one of a plurality of base stations 351 of wireless data network 350.

Authentication and authorization system 320 is shown to include an Authentication and Authorization System (AAS) server 321 and memory storage device 322. In one embodiment, memory storage device 322 resides on server 321 and stores programs and data used in the operation of server 321. While not explicitly illustrated in FIG. 7, server 321 is preferably a secure server in that it is protected by firewall and encryption technologies. In the present embodiment, a TCP-IP layer (not shown) operable on server 321 is used to interface between AAS server and external devices (e.g. server 340 and server 331). However, other protocols could also be used.

Still referring to FIG. 7, transaction site 330 includes a server 331 that is coupled to databasen 332. Database 332 stores data that can be accessed via communication with server 331. In the present embodiment database 332 resides on server 331. Alternatively, database 332 is communicatively coupled to server 331. In one embodiment, server 331 provides only access to data stored in database 332. However, transaction site 330 can be configured to provide any of a number of different types of services. In another embodiment, transaction cite 330 provides web-clipping services through server 324. Alternatively, access to remote data networks is provided through linking server 331, via the Internet 333, with the desired remote data network.

Though FIGS. 6–7 illustrate use of a single authentication and authorization system 320 that is coupled to a single transaction site 330, the present invention is well adapted for use of multiple authentication and authorization systems 320 that couple to a variety of different transaction sites 330. In one such system, each transaction site 330 couples to a single dedicated authentication and authorization system. Alternatively, each authentication and authorization system 320 serves multiple transaction sites 330.

Figure 8:
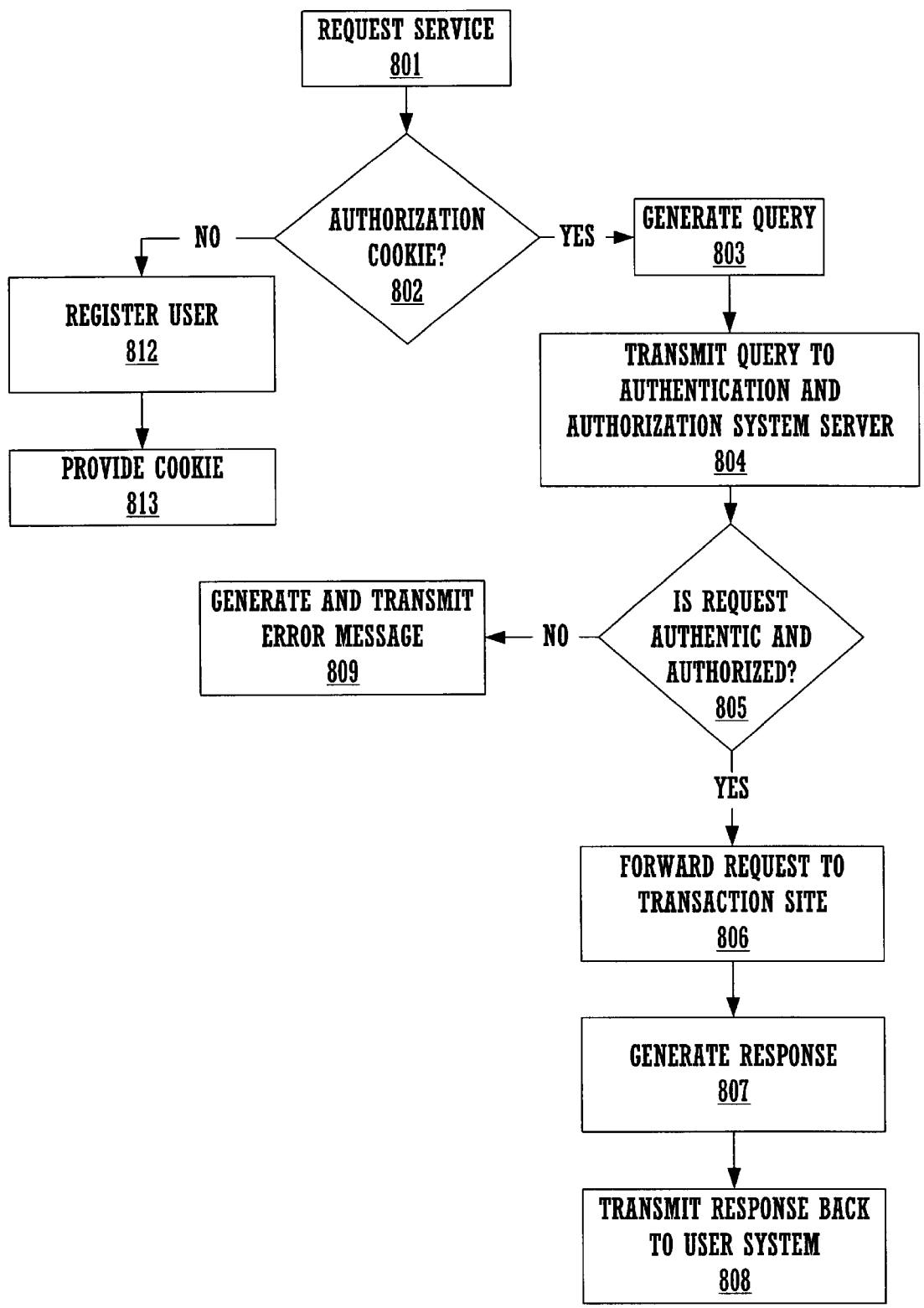
FIG. 8 is a flow chart describing a method for authentication and authorization for transaction processing in accordance with an embodiment of the present invention

Referring now to FIG. 8, method 800 for determining authentication and authorization for transaction processing is shown. First, as shown by step 801, users desiring access to a service generate a request for access to the desired service. Typically, a request involves selection of an icon visible on the display of the client system indicating a particular service.

The first time that a user requests access to a desired service, the user must register as shown by steps 802 and 812. More particularly, when a user does not have an authorization cookie, the user must register to access the desired service. In the embodiment shown in FIG. 6, upon receiving a user request for a desired service, software program 311 searches client system 310 for an authorization cookie that corresponds to the desired service. If no authorization cookie is found, the user is prompted to register in order to receive the desired service.

Any of a number of different methods for registration can be used. In the embodiment shown in FIG. 6, registration is provided by communication between client system 310 and registration server 340. In the present embodiment, the user provides required information that is stored in user database 341. In one embodiment, required information includes billing information (e.g., credit card information and charge authorization), and user identification data (e.g., the user's name or a password). This information is then stored in user database 341. When user database 341 already includes information on a particular user, that information is updated to indicate that the user can access the desired service. In the present embodiment, the submitted information is used to update a user profile that identifies the services that a particular user is allowed to access.

Upon completion of registration, a cookie is provided as shown by step 813. In the embodiment shown in FIG. 6, a cookie is generated by registration server 340 and is transmitted from registration server 340 to client system 310.

In the embodiment shown in FIG. 7, all communications are routed through authentication and authorization system server 321. In this embodiment, registration (step 812) and providing a cookie (step 813) are provided through communication between palmtop computer 100 and server 321. The registration process and the generation of a cookie can be performed by either registration server 340 or authentication and authorization system server 321, or by distributing tasks between registration server 340 and authentication and authorization system server 321.

Figure 9A:
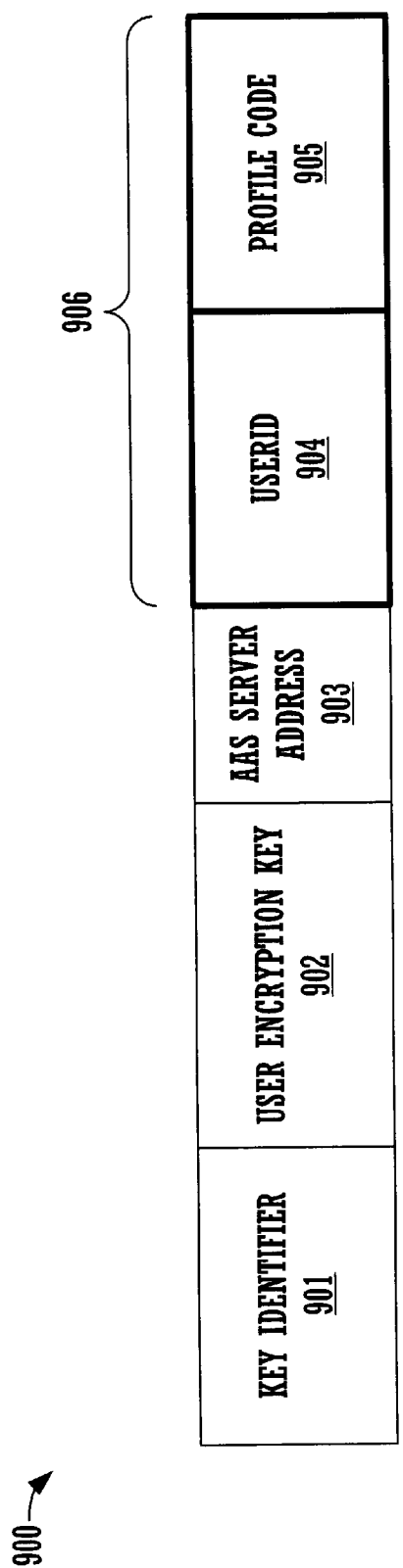
FIG. 9A is a diagram illustrating an exemplary cookie in an embodiment of the present invention.

FIG. 9A shows an exemplary authorization cookie 901 formed in accordance with the present invention. In one embodiment of the present invention, upon receiving all required information, a unique user encryption key 902 is assigned. In the present embodiment, the user encryption key is generated-from an MD5 hash of tree binary seeding components. The first key component is key identifier 901 shown in FIG. 9A. Key identifier 901 is randomly generated arbitrary binary data. In the present embodiment, key identifier 901 is a randomly generated 16-bit string of binary data. The second component is the user identification data (USERID) 904 received from the user during the registration process. Alternatively, the registration server can independently assign user identification data. The third component is a secret key (not shown). The secret key is not stored on cookie 900.

Cookie 900 of FIG. 9A also includes authentication and authorization system (AAS) server address 903. AAS server address 903 provides an address for accessing an authentication and authorization server that provides the desired information or service. This allows for load balancing to spread access across available authentication and authorization servers. The user identification data 904 and a profile code 905 are encrypted to form encrypted buffer 906. Profile code 914 identifies the services that the user is entitled to.

Continuing with FIG. 8, as shown by steps 801–804, once the user has an authorization cookie, subsequent requests generate a query (step 803) that is transmitted to an authentication and authorization system (step 804). In the embodiment shown in FIG. 6, the query is generated by software program 311 of client system 310 using the cookie provided in step 811. The query is then transmitted to authentication and authorization system 320.

In the embodiment of FIG. 7, the query is generated by palmtop computing device 100. The query is then transmitted from palmtop computing device 100, via wireless data network 350, to authentication and authorization system server 321. In the present embodiment, the query is transmitted in the form of a very small message (typically less than 50 bytes). In one embodiment, the query is compressed to further reduce the size of the message.

Figure 9B:
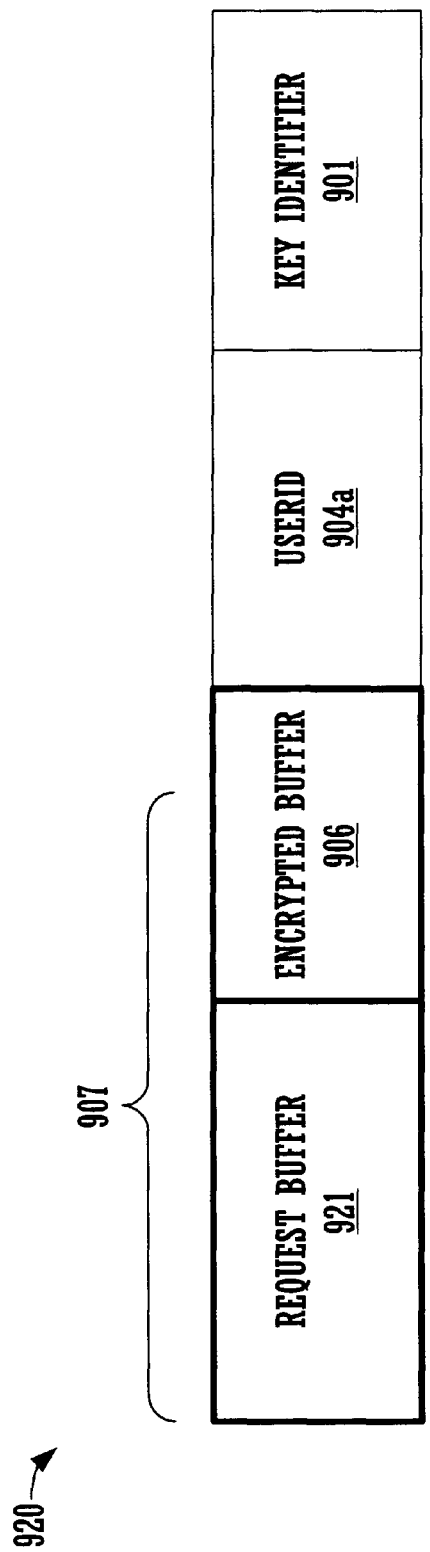
FIG. 9B is a diagram illustrating an exemplary query in an embodiment of the present invention.

In one embodiment, a query is generated by user selection of an icon on the display that indicates the desired service. The user is then prompted to enter the users identification data. Once the user has entered the required user identification data (USERID) 904a, a query is generated. In the present embodiment, a request buffer 921 that contains the desired request (e.g. an addressable TCP/IP formatted data packet) and the encrypted buffer 906 provided in cookie 900 are then encrypted using user encryption key 902. In the present embodiment, a strong encryption algorithm such as the Blowfish encryption algorithm is used. However, alternatively, any encryption algorithm can be used. FIG. 9B shows an exemplary query 920 that includes encrypted portion 907. The input user identification data 904a and key identifier 901 from cookie 900 are then added to encrypted portion 907 "in the clear" (i.e., not encrypted).

As shown by step 805 of FIG. 8, the query transmitted in step 804 is analyzed to determine if the query is authentic and authorized. If the query is authentic and authorized, the request is forwarded to the transaction site as shown by step 806. When the analysis determines that the query is not authentic or not authorized, an error message is generated and the error message is transmitted back to the requesting client system as shown by steps 805 and 809.

In the embodiment shown in FIGS. 6–7, authentication and authorization system 320 analyzes the query (e.g., query 920 of FIG. 9B) to determine whether the query is authentic and authorized. In the present embodiment, authentication and authorization system 320 reads key identifier 901 and user identification data 904a. Authentication and authorization system 320 then reconstructs the unique user encryption key that was allocated to this particular user (user encryption key 902 of FIG. 9A). In the present embodiment, a hash of the three elements used to create user encryption key 902 is performed to reconstruct user encryption key 902. Thus, in the present embodiment, a MD5 hash is performed using user identification data 904a, key identifier 901 and the secret key. Server 321 then uses reconstructed user encryption key 902 to decrypt encrypted portion 907 of query 920. The decryption produces request buffer 921 and encrypted buffer 906. If the decryption fails, the server will return an authentication response to the client system. Thus, when a user fails to enter the proper user identification data 904a, an authentication error is generated (step 809).

A second decryption step is then performed to decrypt encrypted buffer 906, yielding user identification data 904 and profile code 905. In the present embodiment, the secret key that was used to generate user encryption key 902 is used to decrypt encrypted buffer 906. Alternatively, any other key could be used to both encrypt and decrypt encrypted buffer 906.

If the decryption fails, the server will return an authentication failure response to palmtop computer system 100. If the decryption is successful, authentication and authorization system 320 server will compare the entered user identification data 904a with the user identification data 904 from the encrypted buffer 906. If the entered user identification data 904a does not match the user identification data 904 from the encrypted buffer 906, an "authentication failure" response is generated (step 809).

If the entered user identification data 904a matches the user identification data 904 from the encrypted buffer 906, authentication and authorization system 320 then determines authorization. In the present embodiment, authorization is determined by analysis of the profile code. If the profile code indicates that the user is authorized to use the requested service, the unencrypted request buffer is forwarded to transaction site 330. When the profile code does not indicate that the user is authorized to use the requested service, an "authorization failure" response is generated (step 809).

A response to the query is generated as shown by step 807 and is transmitted as shown by step 808 when the query is authentic and authorized. In the embodiment shown in FIG. 7, server 331 generates a response that includes the requested services. Server 331 then transmits the response back to client system 310. In the present embodiment, the response is transmitted from server 331 to authentication and authorization server 321 that routes the response to client system 310. In one embodiment, authentication and authorization server 321 encrypts the response using user encryption key 902, prior to transmitting the response to palmtop computer 100. Optionally, the response is compressed, either before or after encryption, to further reduce wireless data network 350 usage.

According to the embodiments shown in FIGS. 1–9B, authentication and authorization of a query is accomplished without recourse to registration server 340 or user database 341. Thus, the heavy user traffic problems that would arise in a wireless environment of limited bandwidth if the user server were directly accessed for every client request are avoided. Also, because the authentication credentials are located on the client system, the authentication and authorization server can authenticate and authorize users "on the fly" to reduce the adverse effect of wireless network latency on system performance.

The methods and apparatus of the present invention are well adapted for all types of online services. In one embodiment, the services of the present invention include a web clipping service which provides web clippings to a user, as is disclosed in U.S. patent application Ser. No. 09/087, 515, filed May 29, 1998, entitled "Method and Apparatus for Communicating Information over Low Bandwidth Communications Network", by Hawkins et al., that is incorporated herein by reference.

The registration process can be performed multiple times by an authorized-user using different client systems. Each time that a client registers a particular client system, that client system receives a unique user encryption key 902. This allows a user to access services easily, connecting over any available network, to access services using the same account, and allows for the use of multiple client devices. Furthermore, the network of the present invention allows a user to use both palm devices and other types of client device, connecting over any available network, to access services.

In contrast to prior art systems and methods for authentication and authorization, the method and apparatus of the present invention provides single-transmission authentication and authorization. That is, there is no need to send multiple transmissions between the user device and the authorizing server as is required in prior art systems. This approach also has the benefits of providing near instant access to services while simultaneously providing low cost of service by controlling airtime usage. This in turn results in long battery life since transmissions from Palmtop Computer 100 may be a substantial drain on batteries.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for determining authentication and authorization of queries comprising the steps of:

a) receiving a query that comprises user identification data, said query including an unencrypted portion that includes unencrypted data and an encrypted portion, said encrypted portion comprising an encrypted buffer encrypted using a first encryption key and a request buffer, said encrypted buffer and said request buffer encrypted using a second encryption key;

b) determining said second encryption key using at least a portion of said unencrypted data;

c) decrypting at least a portion of said encrypted portion of said query using said second encryption key determined in step b);

d) decrypting said encrypted buffer using said first encryption key;

e) determining authentication by comparing said user identification data to user identification data contained within said encrypted buffer; and f) provided said user identification data matches said user identification data contained within said encrypted buffer, determining authorization using information contained within said encrypted buffer.

2. A method as recited in claim 1 further comprising the step of:

g) transmitting said unencrypted request buffer to a site that provides the desired service when said query is determined to be authentic and authorized.

3. A method as recited in claim 2 further including the steps of:

h) receiving a response from said site that provides the desired service; and i) forwarding said response.

4. A method as recited in claim 3 wherein step i) further includes the steps of:

i1) encrypting said response; and i2) forwarding said response.

5. A method as recited in claim 3 wherein an authentication failure occurs when said decryption in step c) fails.

6. A method as recited in claim 1 wherein said second encryption key is determined using a hash of at least three elements.

7. A method as recited in claim 6 wherein said second encryption key is determined by a MD-5 hash of said user identification data, a randomly generated number and a third encryption key.

8. A method as recited in claim 6 wherein said second encryption key is determined by a MD-5 hash of said user identification data, a randomly generated number and said first encryption key.

9. A computer system comprising:
- a processor coupled to a bus;
- a memory unit coupled to said bus and comprising instructions that when executed by said processor implement a method for determining authentication and authorization of queries comprising the steps of:
  - a) receiving a query that comprises user identification data, said query comprising an unencrypted portion that includes unencrypted data and an encrypted portion, said encrypted portion comprising an encrypted buffer encrypted using a first encryption key and a request buffer, said encrypted buffer and said request buffer encrypted using a second encryption key;
  - b) determining said second encryption key using at least a portion of said unencrypted data;
  - c) decrypting at least a portion of said encrypted portion of said query using said second encryption key determined in step b);
  - d) decrypting said encrypted buffer using said first encryption key;
  - e) determining authentication by comparing said user identification data to user identification data contained within said encrypted buffer; and
  - f) provided said user identification data matches said user identification data contained within said encrypted buffer, determining authorization using information contained within said encrypted buffer.

10. A computer system said recited in claim 9 wherein said method further comprises the step of:
- g) transmitting said unencrypted request buffer to a site that provides the desired service when said query is determined to be authentic and authorized.

11. A computer system as recited in claim 10 wherein said method further comprises the steps of:
- g) receiving a response from said site that provides the desired service: and
- h) forwarding said response.

12. A computer system as recited in claim 11 wherein step h) of said method further comprises the steps of:
- i1) encrypting said response; and
- i2) forwarding said response.

13. A computer system as recited in claim 11 wherein step i) of said method further comprises the steps of:
- i1) compressing said response;
- i2) encrypting said response; and
- i3) forwarding said response.

14. A computer system as recited in claim 9 wherein said second encryption key is determined using a hash of at least three elements.

15. A computer system as recited in claim 14 wherein said second encryption key is determined by a MD-5 hash of said user identification data, a randomly generated number and a third encryption key.

16. A computer system as recited in claim 14 wherein said second encryption key is determined by a MD-5 hash of said user identification data, a randomly generated number and said first encryption key.

17. A method for providing transaction processing in which authentication and authorization of queries from a palmtop computer are determined comprising:
- a) receiving a query from a palmtop computer, said query comprising user identification data, said query comprising an unencrypted portion that includes user identification data input by a user into said palmtop computer and a randomly generated number, said query also comprising an unencrypted portion that includes unencrypted data and an encrypted portion, said encrypted portion comprising an encrypted buffer encrypted using a first encryption key and a request buffer, said encrypted buffer including user identification data and authorization data, said encrypted buffer and said request buffer encrypted using a second encryption key;
- b) determining said second encryption key by performing a hash using said user identification data input by said user and using said randomly generated number and using a third encryption key;
- c) decrypting at least a portion of said encryption portion of said query using said second encryption key determined in step b);
- d) decrypting said encrypted buffer using said first encryption key;
- e) determining authentication by comparing said user identification data input by said user to said user identification data contained within said encrypted buffer; and
- f) provided said user identification data input by said user matches said user identification data contained within said encrypted buffer, determining authorization using said authorization data.

18. A method as recited in claim 17 further comprising the step of:
- g) transmitting said unencrypted request buffer to a site that provides the desired service when said query is determined to be authentic and authorized.

19. The method of claim 18 further comprising the steps of:
- h) receiving a response from said site that provides the desired service; and
- i) forwarding said response to said palmtop computer.

20. The method of claim 17 wherein said hash in step b) is a MD-5 hash.

21. The method of claim 17 wherein said first encryption key is identical to said third encryption key.

* * * * *